United States Patent
Flynn et al.

(10) Patent No.: US 8,433,338 B1
(45) Date of Patent: Apr. 30, 2013

(54) METHOD TO EFFICIENTLY INDEX EXTRACTED IMAGE FEATURES FROM GEOGRAPHICALLY LOCATED IMAGES

(75) Inventors: John Flynn, Marina del Rey, CA (US); Henrik Stewenius, Zurich (CH); James Philbin, Santa Monica, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/220,901

(22) Filed: Aug. 30, 2011

(51) Int. Cl.
*H04W 24/00* (2009.01)

(52) U.S. Cl.
USPC ..................... 455/456.1; 455/456.6

(58) Field of Classification Search .................. 701/211, 701/104.1, 426, 408, 533, 532; 382/190, 382/249, 155, 103, 209; 455/67.11, 456.3, 455/456.1, 457; 348/135, 143
See application file for complete search history.

(56) References Cited

U.S. PATENT DOCUMENTS

| | | | |
|---|---|---|---|
| 7,702,681 B2 | 4/2010 | Brewer et al. | |
| 2006/0271287 A1* | 11/2006 | Gold et al. | 701/211 |
| 2007/0244925 A1* | 10/2007 | Albouze | 707/104.1 |
| 2008/0226119 A1 | 9/2008 | Candelore et al. | |
| 2010/0306200 A1 | 12/2010 | Frank et al. | |

* cited by examiner

Primary Examiner — Kiet Doan
(74) Attorney, Agent, or Firm — McDonnell Boehnen Hulbert & Berghoff LLP

(57) ABSTRACT

The present application discloses systems and methods for querying an image database. In one embodiment, a method is disclosed that includes maintaining in data storage a plurality of images and a plurality of geo-feature identifiers, where each image is associated with at least one geo-feature identifier that indicates at least one geographic cell in which the image was recorded and a visual feature of the image. The method further includes receiving a query image and an indication of a requested geographic location, determining at least one target geographic cell corresponding to the requested geographic location, and identifying at least one target visual feature within the query image. The method further includes determining at least one requested geo-feature identifier based on the at least one target geographic cell and the at least one target visual feature and selecting one or more images based on the at least one requested geo-feature identifier.

16 Claims, 5 Drawing Sheets

METHOD TO EFFICIENTLY INDEX EXTRACTED IMAGE FEATURES FROM GEOGRAPHICALLY LOCATED IMAGES

BACKGROUND

Unless otherwise indicated herein, the materials described in this section are not prior art to the claims in this application and are not admitted to be prior art by inclusion in this section.

Image searching allows a user to search for particular images within a collection of images stored in, for example, a database. In order to search within the collection of images, a user typically provides a search query to a server or other entity that maintains the database. One type of search query is an image query.

In a database arranged for image queries, images are typically indexed according to visual features of the image, as identified through image analysis. The visual features can include, for example, colors, shapes, textures, brightness levels, and other features that are identifiable through image analysis. In order to search a database arranged for image queries, a user typically provides a query image to a server. The server then performs image analysis on the query image to identify one or more visual features of the query image, and the database is searched to locate images including the one or more visual features identified in the query image. The located images are then provided to the user as search results.

SUMMARY

For databases with a large number of images, some image queries may result in a undesirably large number of search results. Accordingly, it may be beneficial to provide a way to further filter an image search based on an image query.

The present application discloses systems and methods for querying an image database in which each image is associated with at least one geo-feature identifier. Each geo-feature identifier indicates at least one geographic cell in which the image was recorded as well as a visual feature of the image.

In one embodiment, a method is disclosed. The method includes maintaining in data storage a plurality of images and a plurality of geo-feature identifiers, where each image in the plurality of images is associated with at least one geo-feature identifier that indicates at least one geographic cell in which the image was recorded and a visual feature of the image. The method further includes receiving a query image and an indication of a requested geographic location, determining at least one target geographic cell corresponding to the requested geographic location, and identifying at least one target visual feature within the query image. The method further includes determining at least one requested geo-feature identifier based on the at least one target geographic cell and the at least one target visual feature and selecting one or more images from the plurality of images based on the at least one requested geo-feature identifier.

In another embodiment, a non-transitory computer readable medium is disclosed having stored therein instructions executable by a computing device to cause the computing device to perform functions comprising the method described above.

In yet another embodiment, a server is disclosed. The server includes an input interface configured to receive a query image and an indication of a requested geographic location, at least one processor, and data storage. The data storage includes a plurality of images and a plurality of geo-feature identifiers, where each image in the plurality of images is associated with at least one geo-feature identifier that indicates at least one geographic cell in which the image was recorded and a visual feature of the image. The data storage further includes searching logic executable by the processor to (i) determine at least one target geographic cell corresponding to the requested geographic location, (ii) identify at least one target visual feature within the query image, (iii) determine at least one requested geo-feature identifier based on the at least one target geographic cell and the at least one target visual feature, and (iv) select one or more images from the plurality of images based on the at least one requested geo-feature identifier.

Other embodiments are described below. The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

The following detailed description describes various features and functions of the disclosed systems and methods with reference to the accompanying figures. In the figures, similar symbols typically identify similar components, unless context dictates otherwise. The illustrative system and method embodiments described herein are not meant to be limiting. It will be readily understood that certain aspects of the disclosed systems and methods can be arranged and combined in a wide variety of different configurations, all of which are contemplated herein.

1. Example System

Figure 1:
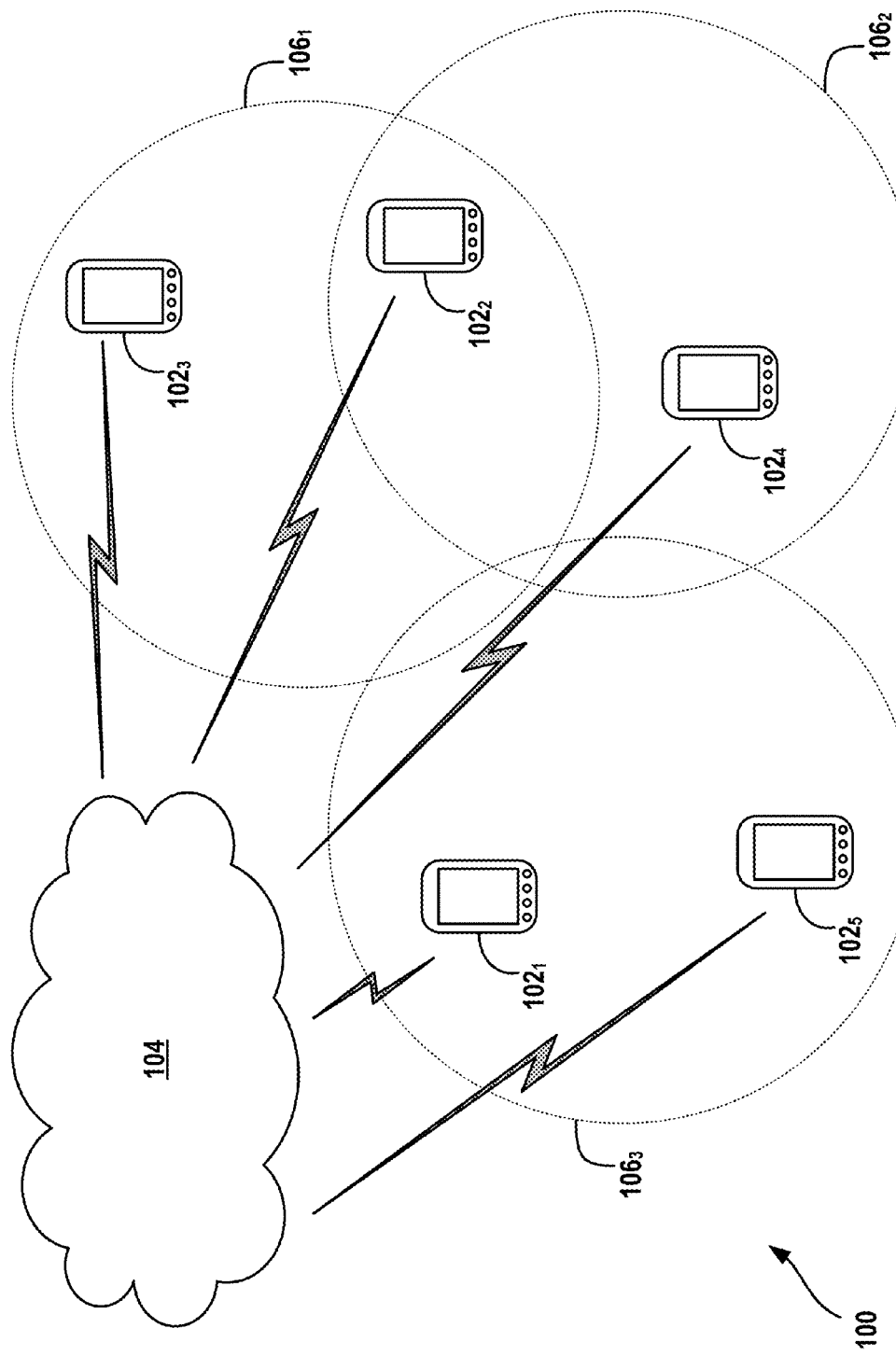
FIG. 1 is a schematic diagram of an example system, in accordance with an embodiment.

FIG. 1 is a schematic diagram of an example system 100, in accordance with an embodiment. As shown, system 100 includes a plurality of client devices $102_1$-$102_5$. Each of the client devices 102 is wirelessly coupled to a server 104 via one or more packet-switched networks (not shown). While five client devices 102 are shown, more or fewer client devices 102 are possible as well.

As shown, the client devices 102 are smartphones, though other types of client devices 102 could additionally or alternatively be used. For example, each of the client devices 102 may be a tablet computer, a laptop computer, a desktop computer, a head-mounted or otherwise wearable computer, or any other device configured to wirelessly couple to server 104.

Each client device 102 may be configured to transmit to the server 104 a query image. The query image may be an image recorded at the client device 102, or may be an image recorded at another entity and transmitted (e.g., via a wired or wireless connection) to the client device 102. In some embodiments, the query image may include more than one image.

Each client device 102 may be further configured to transmit to the server 104 an indication of a requested geographic location. The requested geographic location may be, for example, a geographic location of the client device 102. In this example, the client device 102 may be further configured to determine an estimate of the requested geographic location. The estimate of the requested geographic location may, in some embodiments, be determined and transmitted only with permission of a user, or following notification to the user that the geographic location of the client device is being determined and transmitted to the server. In another example, the requested geographic location may be, for example, a geographic location entered into the client device 102 by a user of the client device 102. In this example, the client device 102 may be further configured to receive the requested geographic location from the user via, for example, a user interface. In one embodiment, the client device 102 may be configured to receive the requested geographic location from the user as geographic coordinates, such as latitude and longitude. In another embodiment, the client device 102 may be configured to receive the requested geographic location from the user as a selection on a map or other visual display. The client device 102 may be configured to receive the requested geographic location from the user in other manners as well.

Each client device 102 may be further configured to transmit additional information to the server 104 as well. For example, each client device 102 may be configured to transmit an estimate of error in the requested geographic location. Other examples are possible as well.

Server 104 may be configured to receive from the client device 102 the query image and the indication of the requested geographic location. Further, server 104 may be configured to determine at least one target geographic cell corresponding to the requested geographic location. Example geographic cells 106$_1$-106$_3$ are shown in FIG. 1. The geographic cells 106 may take several forms.

In one example, each geographic cell 106 may be defined by a wireless network entity, such as a base station or wireless router, such that any client device 102 coupled to the wireless network entity is located in the geographic cell 106 defined by the wireless network entity. In this example, if the requested geographic location is the location of the client device 102, the indication of the requested geographic location may be or may include an indication of the wireless network entity. The indication may be explicit (e.g., an identification of the wireless network entity) or implicit (e.g., transmission of the image query to server 104 through the wireless network entity). In another example, each geographic cell 106 may be manually or automatically defined at, for example, the server 104, such that a client device having a geographic location within a defined geographic cell 106 is located in the geographic cell 106. In this example, whether the requested geographic location is the location of the client device or another location, the indication of the requested location may be or may include geographic coordinates identifying the geographic location. The geographic coordinates may be used by server 104 to determine the target geographic cell or cells corresponding to the requested location. Other examples are possible as well.

In embodiments where the server 104 additionally receives from the client device 102 an indication of an estimated error in the requested geographic location, the geographic cells 106 may be variable based on the estimated error. For example, for a larger estimated error the geographic cells 106 may be varied to cover a larger geographic area, while for a smaller estimated error the geographic cells 106 may be varied to cover a smaller geographic area. The varying of the geographic cells 106 may be done manually or automatically at, for example, the server 104. Alternately, in these embodiments, the server 104 may determine more or fewer target geographic cells corresponding to the requested location based on the estimated error. For example, for a larger estimated error the server 104 may determine more target geographic cells corresponding to the requested location than for a smaller estimated error. Other examples are possible as well.

The server 104 may be further configured to select one or more images from a database based on the query image and the determination of the at least one target geographic cell. The serer 104 may be still further configured to transmit the selected images to the client device 102.

An example server is further described below in connection with FIG. 2, while an example client device is further described below in connection with FIG. 4.

a. Example Server

Figure 2:
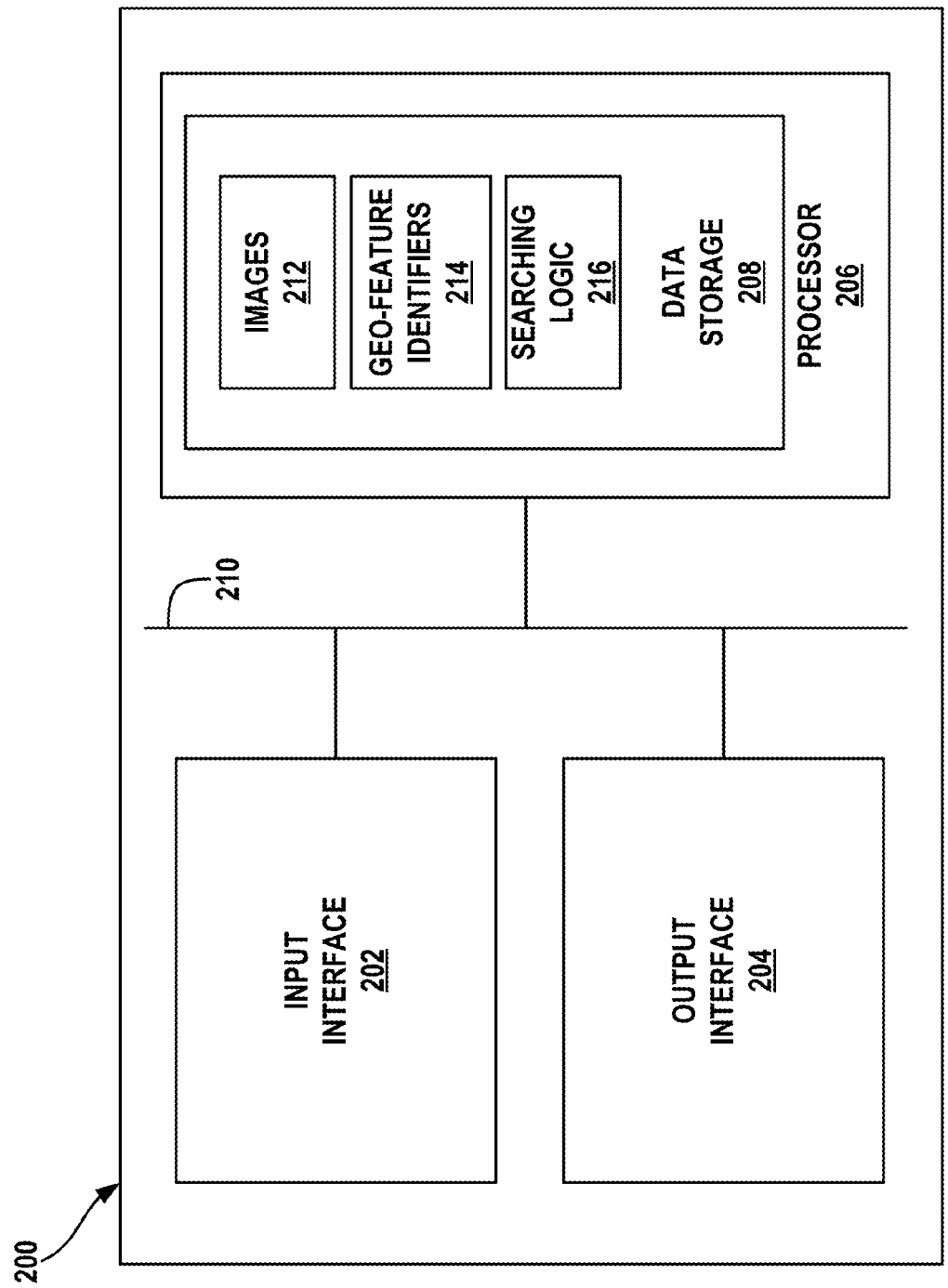
FIG. 2 shows a block diagram of an example server, in accordance with an embodiment.

FIG. 2 shows a block diagram of an example server, in accordance with an embodiment. As shown, the server 200 includes an input interface 202, an output interface 204, a processor 206, and data storage 208, all of which may be communicatively linked together by a system bus, network, and/or other connection mechanism 210.

The input interface 202 may be any interface configured to receive a query image and an indication of a requested geographic location. As described above, the query image and the indication of the requested geographic location may be received from, for example, a client device. To this end, the input interface 202 may be, for example, a wireless interface. The wireless interface 202 may include an antenna and a chipset for communicating with the client device over an air interface. The chipset or input interface 202 in general may be arranged to communicate according to one or more types of wireless communication (e.g. protocols) such as Bluetooth, communication protocols described in IEEE 802.11 (including any IEEE 802.11 revisions), cellular technology (such as GSM, CDMA, UMTS, EV-DO, WiMAX, or LTE), or Zigbee, among other possibilities. Alternately or additionally, the input interface 202 may be a web-based interface accessible by a user using the client device. The input interface 202 may take other forms as well. In some embodiments, the input interface 202 may also be configured to wirelessly communicate with one or more entities besides the client device.

The output interface 204 may be any interface configured to transmit one or more images selected by the server 200 to the client device. To this end, the output interface 204 may be, for example, a wireless interface, such as any of the wireless interface described above. In some embodiments, the output interface 204 may also be configured to wirelessly communicate with one or more entities besides the client device. In some embodiments, the output interface 204 may be integrated in whole or in part with the input interface 202.

The processor 206 may comprise one or more general-purpose processors and/or one or more special-purpose processors. To the extent the processor 206 includes more than one processor, such processors could work separately or in combination. Further, the processor 206 may be integrated in whole or in part with the input interface 202, the output interface 204, and/or with other components.

Data storage 208, in turn, may comprise one or more volatile and/or one or more non-volatile storage components, such as optical, magnetic, and/or organic storage, and data storage 208 may be integrated in whole or in part with the processor 206. Data storage 208 may comprise a plurality of images 212 and geo-feature identifiers 214. Each image 212 may be associated with at least one geo-feature identifier 214 that indicates at least one geographic cell in which the image was recorded as well as a visual feature of the image 212. For images with more than one visual feature, a separate geo-feature identifier 214 may be associated with the image 212 for each visual feature.

Figure 3A:
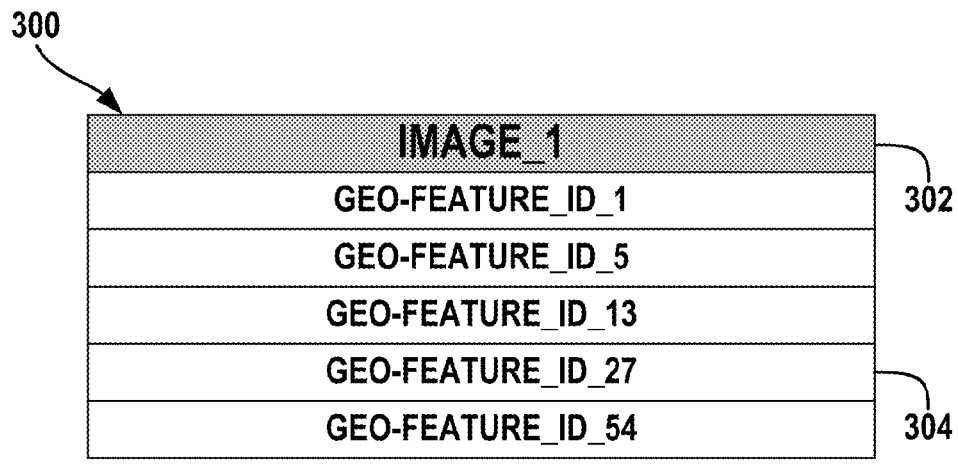
FIGS. 3A-3C show example data for an image associated with a plurality of geo-feature identifiers (3A), a geo-feature identifier associated with a plurality of images (3B), and a geo-feature identifier associated with a geographic call and a visual feature (3C).
Figure 3B:
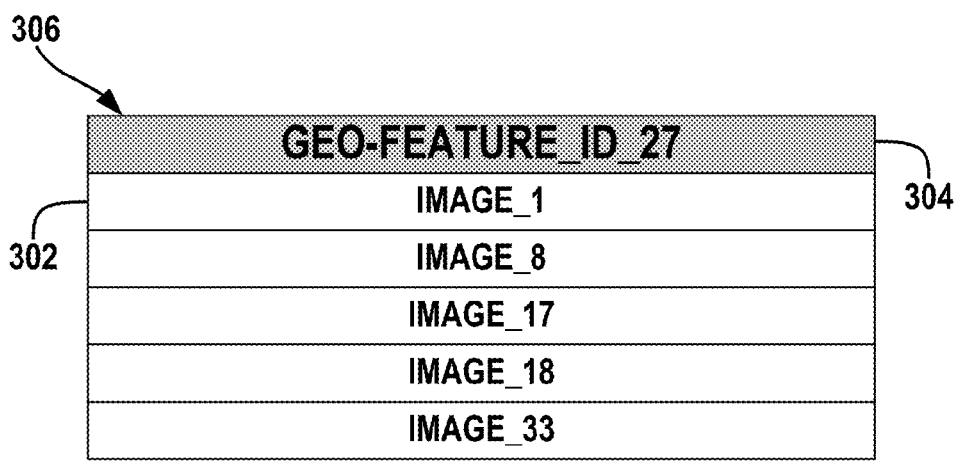

FIG. 3A shows example data for an image associated with a plurality of geo-feature identifiers. As shown, data 300 includes an indication of an image 302 (IMAGE_1) with which several geo-feature identifiers are associated, including geo-feature identifier 304 (GEO-FEATURE_ID_27). Just as the image 302 may have several geo-feature identifiers associated with it, each geo-feature identifier may be associated with several images. An example is shown in FIG. 3B. FIG. 3B shows example data for a geo-feature identifier associated with a plurality of images. As shown, data 306 includes an indication of a single geo-feature identifier 304 (GEO-FEATURE_ID_27) with which several images are associated, including the image 302 (IMAGE_1). The images in data storage 208 may be organized by image (as in data 300), by geo-feature identifier (as in data 306), or any combination thereof. Other data types are possible as well.

In some embodiments, the indication of the image 302 may be a pointer to a location in data storage 208 (or other data storage accessible by server 200) where the image 302 is stored. The image 302 may be stored in any image file format, such as a raster image file format (e.g., JPEG or GIF) or a vector image file format (e.g., CGM). Other image file formats are possible as well.

Figure 3C:
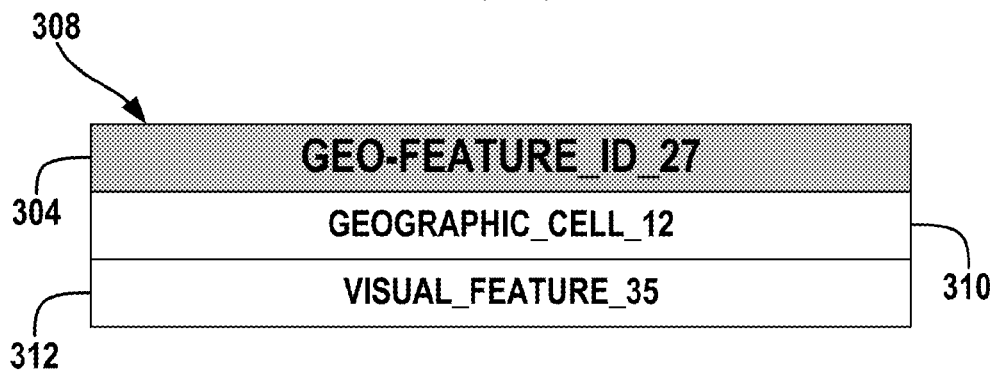

Similarly, in some embodiments the indication of the geo-feature identifier 304 may be a pointer to a location in data storage 208 (or other data storage accessible by the server 200) where further data describing the geo-feature identifiers is stored. FIG. 3C shows example data for a geo-feature identifier associated with a geographic call and a visual feature. As shown, data 308 includes an indication of a geo-feature identifier 304 (GEO-FEATURE_ID_27) as well as an indication of a geographic cell 310 (GEOGRAPHIC_CELL_12) and a visual feature 312 (VISUAL_FEATURE_35). The geographic cell 310 may be the geographic cell in which images associated with the geo-feature identifier 304 were recorded. Further, the visual feature 312 may be a visual feature found in the images associated with the geo-feature identifier 304.

In some embodiments, the indication of the geographic cell 310 may take the form of coordinates indicating a location in real space, such as latitude and longitude coordinates and a radius, such that the cell is defined by a circle of the radius centered at the location in real space. In other embodiments, the indication of the geographic cell 310 may take the form of an identification of a wireless network entity. The indication of the geographic cell 310 may take other forms as well.

In some embodiments, the indication of the visual feature 312 may take several forms. In general, the indication of the visual feature 312 may include an indication of a type of visual feature (e.g., colors, shapes, textures, and brightness levels). Further, the indication of the visual feature 312 may take the form of a quantitative value representing the visual feature, such as a value representing the color or the brightness. The indication of the visual feature 312 may take other forms as well.

Returning to FIG. 2, data storage 208 may further include the query image and the indication of the requested geographic location received from the client device. Still further, data storage 208 may contain data specifying one or more geographic cells, such as the geographic cells described above.

Further, data storage 208 may include searching logic 216. Searching logic 216 may be executable by the processor 206 to carry out the various server functions described herein. In particular, searching logic 216 may be executable by the processor 206 to carry out the server functions described below in connection with FIG. 5.

The server 200 may include one or more elements in addition to or instead of those shown.

b. Example Client Device

Figure 4:
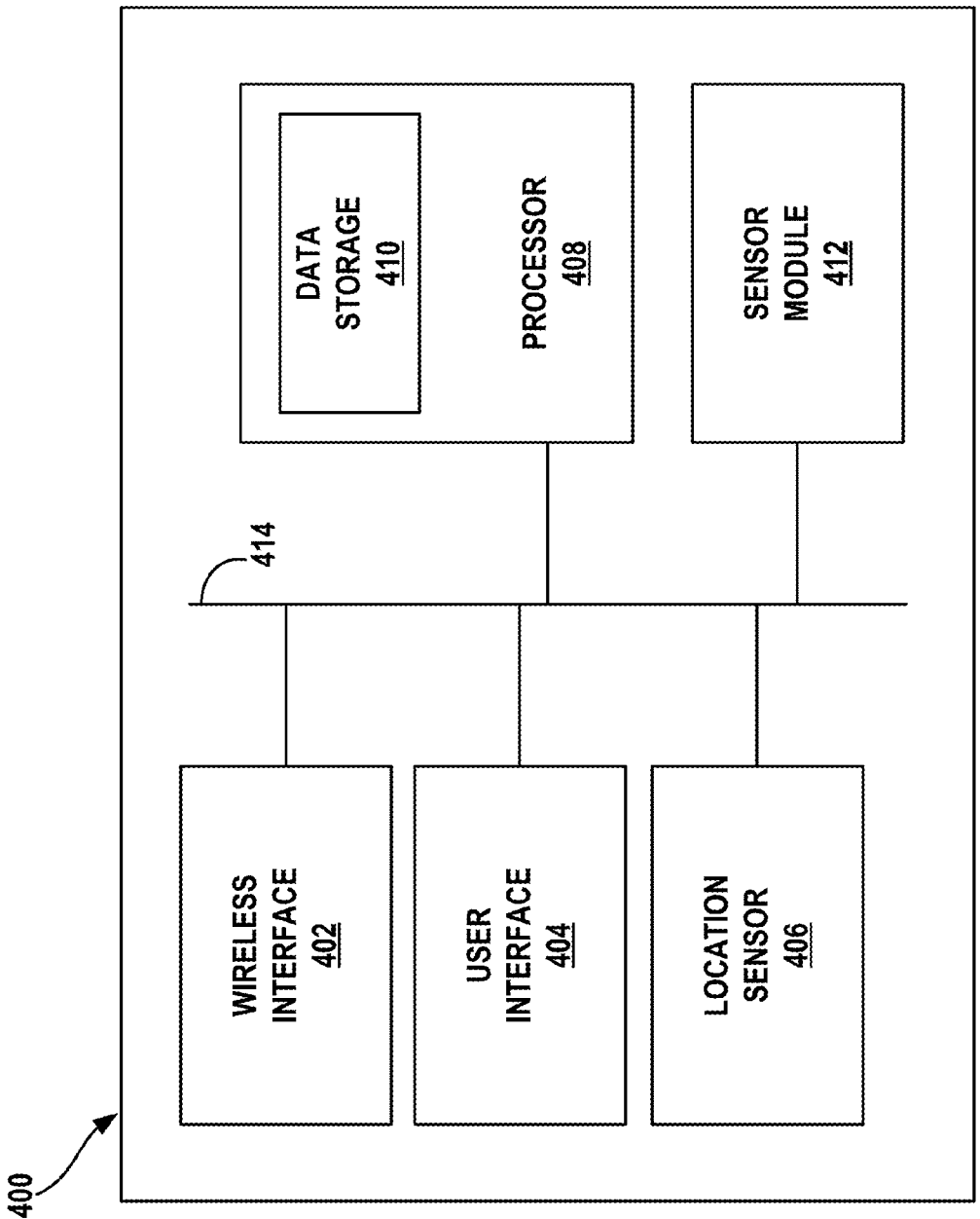
FIG. 4 shows a block diagram of an example client device, in accordance with an embodiment.

FIG. 4 shows a block diagram of an example client device, in accordance with an embodiment. As shown, the client device 400 includes a wireless interface 402, a user interface 404, a location sensor 406, a processor 408, data storage 410, and a sensor module 412, all of which may be communicatively linked together by a system bus, network, and/or other connection mechanism 414.

The wireless interface 402 may be any interface configured to wirelessly communicate with a server. In particular, the wireless interface 402 may be any interface configured to transmit to the server an image query and an indication of a requested location. To this end, the wireless interface 402 may be any of the wireless interfaces described above. In some embodiments, the wireless interface 202 may also be configured to wirelessly communicate with one or more entities besides the server.

The user interface 404 may include one or more components for receiving input from a user of the client device 400, as well as one or more components for providing output to a user of the client device 400. For example, the user interface 404 may be configured to receive from the user of the client device 400 an indication of the query image and/or the requested geographic location. To this end, the user interface 404 may include buttons, a touchscreen, a microphone, and/or any other elements for receiving inputs, as well as a speaker, one or more displays, and/or any other elements for communicating outputs. Further, the user interface 404 may include analog/digital conversion circuitry to facilitate conversion between analog user input/output and digital signals on which the client device 400 can operate.

The location sensor 406 may include one or more sensors configured to aid in determining a location of the client device 400, such as a Global Positioning System (GPS) receiver, an accelerometer, a gyroscope, and/or a compass. Other location sensors as are possible as well. In embodiments where the requested geographic location is the location of the client device 400, the location of the client device 400 may be estimated using the location sensor 406, and the requested geographic location may be the estimated location. As noted above, in embodiments where the requested geographic location is the location of the client device 400, the estimate of the requested geographic location may, in some embodiments, be determined only with permission of a user, or following notification to the user that the geographic location of the client device 400 is being determined. In some embodiments, instead of using the location sensor 406, the client device 400 may receive indications of its location periodically or as requested from another entity. In these embodiments, the requested geographic location may be the last-received indication of the location of the client device 400.

The processor 408 may comprise one or more general-purpose processors and/or one or more special-purpose processors. To the extent the processor 408 includes more than one processor, such processors may work separately or in combination. Further, the processor 408 may be integrated in whole or in part with the wireless interface 402, the user interface 404, and/or with other components.

Data storage 410, in turn, may comprise one or more volatile and/or one or more non-volatile storage components, such as optical, magnetic, and/or organic storage, and data storage 410 may be integrated in whole or in part with the processor 408. In an embodiment, data storage 410 may contain program logic executable by the processor 408 to carry out various client device functions. For example, data storage 410 may contain program logic executable by the processor 408 to transmit to the server a query image and an indication of a requested geographic location. Other examples are possible as well.

In some embodiments, the client device may additionally include a sensor module 412. The sensor module 412 include one or more sensors and/or tracking devices configured to sense one or more types of information. Example sensors include video cameras, still cameras, infrared sensors, optical sensors, biosensors, Radio Frequency identification (RFID) systems, wireless sensors, pressure sensors, temperature sensors, and/or magnetometers, among others. Information sensed by one or more of the sensors may be used by the client device 400 in, for example, generating a query image and/or determining the requested geographic location. Depending on the sensors included in the sensor module 412, data storage 410 may further include program logic executable by the processor 408 to control and/or communicate with the sensors, and/or transmit to the server data representing information sensed by one or more sensors.

The client device 400 may include one or more elements in addition to or instead of those shown. For example, the client device 400 may include components configured to receive from one or more external devices data representing a query image. Other examples are possible as well.

2. Example Method

Figure 5:
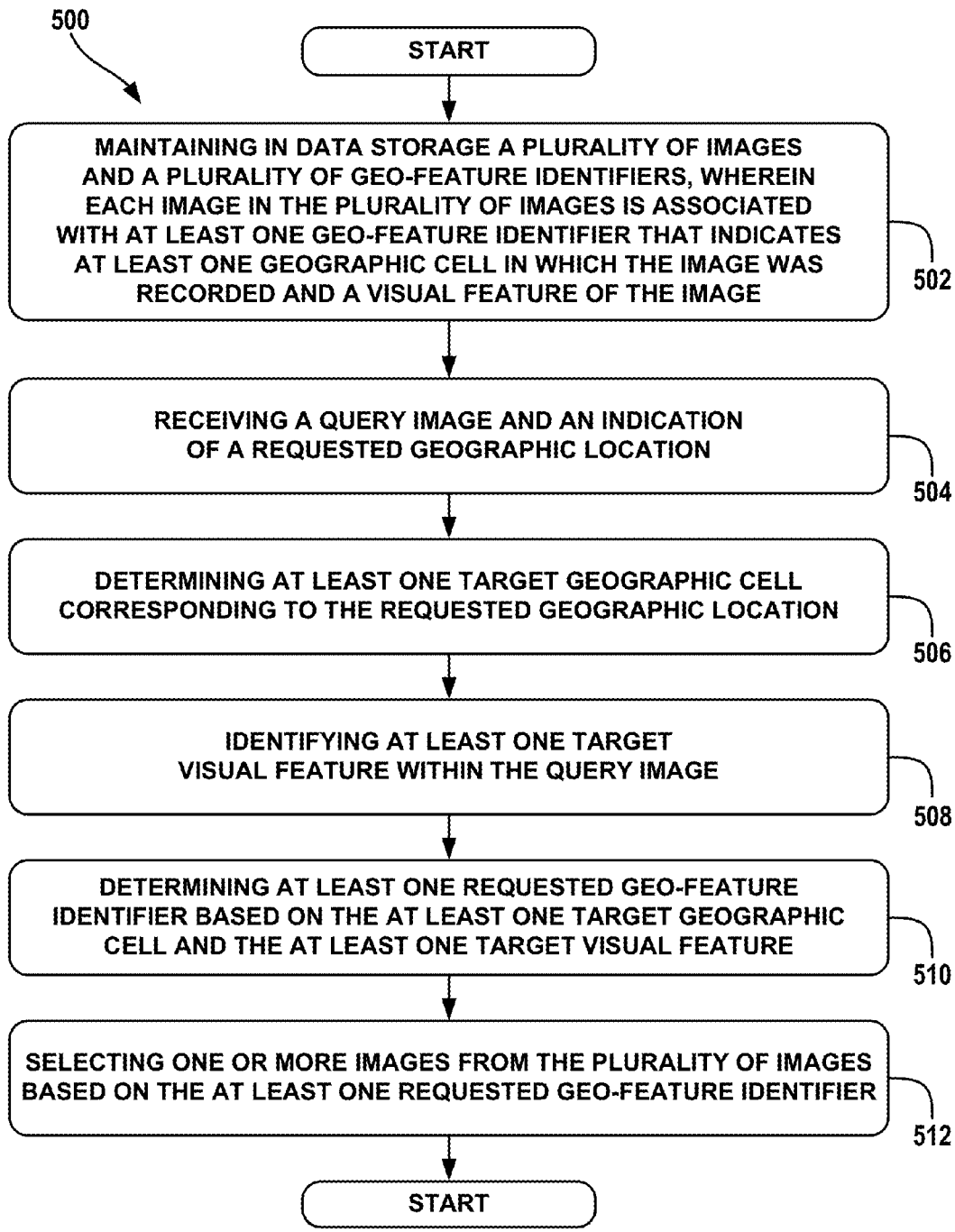
FIG. 5 shows a flow chart according to an embodiment of a method for querying an image database in which each image is associated with at least one geo-feature identifier.

FIG. 5 shows a flow chart according to an embodiment of a method for querying an image database in which each image is associated with at least one geo-feature identifier.

Method 500 shown in FIG. 5 presents an embodiment of a method that, for example, could be used with the systems, client devices, and servers described herein. Method 500 may include one or more operations, functions, or actions as illustrated by one or more of blocks 502-512. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

In addition, for the method 500 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include a non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, and compact-disc read only memory (CD-ROM), for example. The computer readable media may also be any other volatile or non-volatile storage systems. The computer readable medium may be considered a computer readable storage medium, a tangible storage device, or other article of manufacture, for example.

In addition, for the method 500 and other processes and methods disclosed herein, each block may represent circuitry that is wired to perform the specific logical functions in the process.

As shown, the method 500 begins at block 502 where a server maintains in data storage a plurality of images and a plurality of geo-feature identifiers. Each image in the plurality of images may be associated with at least one geo-feature identifier that indicates at least one geographic cell in which the image was recorded as well as a visual feature of the image. The geographic cell or cells may be predefined by, for example, the server. Other examples are possible as well.

The method 500 continues at block 504 where the server receives a query image and an indication of a requested geographic location. As described above, the query image and the indication of the requested geographic location may be received from a client device.

The query image may be, for example, an image recorded at the client device or an image recorded at another entity and transmitted to the client device. The query image may take other forms as well.

The requested geographic location may be, for example, a geographic location of the client device or a geographic location entered into the client device by a user of the client device. As noted above, in embodiments where the requested geographic location is the location of the client device 400, the estimate of the requested geographic location may, in some embodiments, be determined and transmitted to the server only with permission of a user, or following notification to the user that the geographic location of the client device is being determined and transmitted to the server. In some embodiments, the indication of the requested geographic location may take the form of a set of geographic coordinates, such as latitude and longitude. Further, in some embodiments, the indication of the requested geographic location may include an estimate of error in the location of the client device. The indication of the requested geographic location may take other forms as well.

The method 500 continues at block 506 where the server determines at least one target geographic cell corresponding to the requested geographic location. In some embodiments, this may involve the server referencing data defining one or more geographic cells with the requested geographic location in order to determine a target geographic cell in which the requested geographic location is located. In other embodiments, this may involve the server determining a wireless network entity (explicitly or implicitly) identified in the requested geographic location and referencing data defining one or more geographic cells with the identified wireless network entity in order to determine a target geographic cell in which the requested geographic location is located. In embodiments where the indication of the requested geographic location includes an estimate of error in the location of the client device, this may involve the server referencing data defining one or more geographic cells with the requested geographic location and the estimate of error in order to determine one or more target geographic cells in which the requested geographic location may be located. The server may determine the target geographic cell(s) in other ways as well.

The method 500 continues at block 508 where the server identifies at least one target visual feature within the query image. In one example, this may involve the server computing a so-called descriptor vector for one or more regions of the query image. For example, the server may identify a number of regions within the query image. The regions may be, for example, regions having detectable characteristics, such as colors, geometries, textures, brightness levels, shapes and other visual features. Alternately or additionally, the regions may be local extrema in the scale-space of the image or a derivative of the image. Still alternately or additionally, the regions may be the result of stability analysis of a flood fill computed over a grayscale map of the image. The regions may take other forms as well. For each region, the server may compute a descriptor vector that describes the detectable characteristics of the region. From the descriptor vectors, the server may identify the at least one target visual feature within the query image.

The server may compute the descriptor vectors in a number of ways. In one example, the server may compute the descriptor vector for each region by convolving the region with Gabor wavelets of different sizes, orientations, and frequency octaves. A similarity (e.g., affine) transform may be first applied to the region to make the descriptor vector robust to global image transformations. The server may compute the descriptor vector in other ways as well.

Further, the server may identify the at least one target visual feature within the query image in other ways as well, including those in which descriptor vectors are not computed.

The method 500 continues at block 510 where the server determines at least one requested geo-feature identifier based on the target geographic cell(s) and the target visual feature(s). The server may determine the requested geo-feature identifier in several ways. In some embodiments, the server may select as the at least one requested geo-feature identifier at least one geo-feature identifier from the plurality of geo-feature identifiers that indicates the target geographic cell(s) and the target visual feature(s). In other embodiments, the server may select from the plurality of geo-feature identifiers a candidate set of one or more geo-feature identifiers that indicate the target geographic cell(s). Further, the server may select as the requested geo-feature identifier at least one geo-feature identifier in the candidate set that indicates the target visual feature(s). The server may determine the requested geo-feature identifier in other ways as well.

The method 500 continues at block 512 where the server selects one or more images from the plurality of images based on the at least one requested geo-feature identifier. The server may select the images in several ways. In some embodiments, the server may select one or more images associated with the at least one requested geo-feature identifier. In other embodiments, the at least one requested geo-feature identifier may be two or more requested geo-feature identifiers. In these embodiments, the server may select one or more images associated with each of the two or more requested geo-feature identifiers. In still other embodiments, the at least one requested geo-feature identifier may be a plurality of requested geo-feature identifiers. In these embodiments, the server may select one or more images based on one or more of the requested geo-feature identifiers, the geo-feature identifiers associated with each of the one or more images, a number of geo-feature identifiers associated with the query image, a number of geo-feature identifiers associated with each of the one or more images, a geometric configuration of the visual features (of the requested geo-feature identifiers) in the query image, and a geometric configuration of the visual features of geo-feature identifiers associated with each of the one or more images. In other embodiments, the server may select up to a predetermined number of images. The server may select the images in other ways as well.

In some embodiments, the server may transmit the selected images to the client device. In some embodiments, the server may filter and/or rank the selected images before transmitting the selected images to the client. The server may filter and/or rank the selected images based on, for example, a number of requested geo-feature identifiers associated with the image, previous query images received from the client device, previous query images received from the requested geographic location, or other criteria.

Once the server transmits the selected images to the client device, the client device may receive the selected images. In this manner, the client device may receive search results in response to an image query.

While the foregoing description focused on a database arranged for image queries, it is envisioned that the methods, servers, and client devices described above could be adapted for use with a database arranged for both metadata queries and image queries. Metadata associated with the query image and/or the images stored in the database may be used for one or more of determining the requested geo-feature identifier(s), selecting images from the plurality of images, and filtering and/or ranking the selected images. The metadata could be used in other ways as well.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method, comprising:
maintaining in data storage a plurality of images and a plurality of geo-feature identifiers, wherein each image in the plurality of images is associated with at least one geo-feature identifier that indicates at least one geographic cell in which the image was recorded and a visual feature of the image;
receiving a query image from a client device;
receiving an indication of a requested geographic location, wherein the indication of the geographic location comprises an indication of a location of the client device and an estimate of error in the location of the client device;
determining at least one target geographic cell corresponding to the requested geographic location;
identifying at least one target visual feature within the query image;
determining at least one requested geo-feature identifier based on the at least one target geographic cell and the at least one target visual feature; and
selecting one or more images from the plurality of images based on the at least one requested geo-feature identifier.

2. The method of claim 1, wherein determining at least one requested geo-feature identifier based on the at least one target geographic cell and the at least one target visual feature comprises selecting as the at least one requested geo-feature identifier at least one geo-feature identifier from the plurality of geo-feature identifiers that indicates the at least one target geographic cell and the at least one target visual feature.

3. The method of claim 1, wherein determining at least one requested geo-feature identifier based on the at least one target geographic cell and the at least one target visual feature comprises:
selecting from the plurality of geo-feature identifiers a candidate set of one or more geo-feature identifiers that indicate the at least one target geographic cell; and selecting as the at least one requested geo-feature identifier at least one geo-feature identifier in the candidate set that indicates the at least one target visual feature.

4. The method of claim 1, wherein selecting one or more images from the plurality of images based on the at least one requested geo-feature identifier comprises selecting one or more images associated with the at least one requested geo-feature identifier.

5. The method of claim 1, wherein the at least one requested geo-feature identifier comprises two or more requested geo-feature identifiers, and wherein selecting one or more images from the plurality of images based on the at least one requested geo-feature identifier comprises selecting one or more images associated with each of the two or more requested geo-feature identifiers.

6. The method of claim 1, wherein the indication of the location of the client device comprises a set of geographic coordinates.

7. The method of claim 1, further comprising transmitting the one or more images to the client device.

8. The method of claim 1, wherein the at least one geographic cell and the at least one target geographic cell comprise predefined geographic cells.

9. A server, comprising:
an input interface configured to receive a query image and an indication of a requested geographic location, wherein the indication of the geographic location comprises an indication of a location of a client device and an estimate of error in the location of the client device;
at least one processor; and
data storage comprising:
a plurality of images and a plurality of geo-feature identifiers, wherein each image in the plurality of images is associated with at least one geo-feature identifier that indicates at least one geographic cell in which the image was recorded and a visual feature of the image; and
searching logic executable by the at least one processor to (i) determine at least one target geographic cell corresponding to the requested geographic location, (ii) identify at least one target visual feature within the query image, (iii) determine at least one requested geo-feature identifier based on the at least one target geographic cell and the at least one target visual feature, and (iv) select one or more images from the plurality of images based on the at least one requested geo-feature identifier.

10. The server of claim 9, wherein the input interface comprises a wireless interface.

11. The server of claim 9, further comprising an output interface configured to transmit the one or more images to the client device.

12. The server of claim 11, wherein the output interface comprises a wireless interface.

13. The server of claim 9, wherein determining at least one requested geo-feature identifier based on the at least one target geographic cell and the at least one target visual feature comprises selecting from the plurality of geo-feature identifiers at least one geo-feature identifier that indicates the at least one target geographic cell and the at least one target visual feature.

14. The server of claim 9, wherein the at least one geographic cell and the at least one target geographic cell comprise predefined geographic cells.

15. A non-transitory computer readable medium having stored therein instructions executable by a computing device to cause the computing device to perform functions comprising:
maintaining in data storage a plurality of images and a plurality of geo-feature identifiers, wherein each image in the plurality of images is associated with at least one geo-feature identifier that indicates at least one geographic cell in which the image was recorded and a visual feature of the image;
receiving a query image and an indication of a requested geographic location, wherein the indication of the requested geographic location comprises an indication of a location of a client device and an estimate of error in the location of the client device;
determining at least one target geographic cell corresponding to the requested geographic location;
identifying at least one target visual feature within the query image;
determining at least one requested geo-feature identifier based on the at least one target geographic cell and the at least one target visual feature; and
selecting one or more images from the plurality of images based on the at least one geo-feature identifier.

16. The non-transitory computer readable medium of claim 15, wherein determining at least one requested geo-feature identifier based on the at least one target geographic cell and the at least one target visual feature comprises selecting from the plurality of geo-feature identifiers at least one geo-feature identifier that indicates the at least one target geographic cell and the at least one target visual feature.

* * * * *